United States Patent [19]
Kanda

[11] Patent Number: 5,649,513
[45] Date of Patent: Jul. 22, 1997

[54] COMBUSTION CHAMBER OF INTERNAL COMBUSTION ENGINE

[75] Inventor: Mutsumi Kanda, Susono, Japan

[73] Assignee: Toyota Jidosha Kabushiki Kaisha, Aichi, Japan

[21] Appl. No.: 591,097

[22] Filed: Jan. 25, 1996

[30] Foreign Application Priority Data

Jan. 30, 1995 [JP] Japan .................................. 7-012666

[51] Int. Cl.$^6$ .................................................. F02B 15/00
[52] U.S. Cl. ................................................................ 123/432
[58] Field of Search ...................................... 123/432, 308, 123/193 CH, 315, 90.23, 65 VD

[56] References Cited

U.S. PATENT DOCUMENTS

| | | | |
|---|---|---|---|
| 4,907,554 | 3/1990 | Bergeron | 123/432 |
| 4,926,823 | 5/1990 | Kishi et al. | 123/432 |
| 4,974,566 | 12/1990 | LoRusso et al. | 123/308 |
| 5,016,582 | 5/1991 | Onodera | 123/432 |
| 5,125,374 | 6/1992 | Saito | 123/432 |
| 5,203,288 | 4/1993 | Melchoir et al. | 123/65 VD |
| 5,463,995 | 11/1995 | Sakai et al. | 123/432 |

FOREIGN PATENT DOCUMENTS

| | | | |
|---|---|---|---|
| 3838349 | 6/1989 | European Pat. Off. | 123/432 |
| 62-247105 | 10/1987 | Japan . | |
| 4159419 | 6/1992 | Japan . | |
| 4-159419 | 6/1992 | Japan | 123/432 |
| 5106452 | 4/1993 | Japan . | |

OTHER PUBLICATIONS

Patent Abstracts Of Japan, vol. 010, No. 083 (M–466), Apr. 2, 1966 & JP–a–60 224921 (Toyota Jidosha KK), Nov. 9, 1985.
Patent Abstracts Of Japan, vol. 016, No. 452 (M–1313, Sep. 21, 1992 & JP–A–04 159419 (Mazda Motor Corp.), Jun. 2, 1992.
Patent Abstracts Of Japan, vol. 007, No. 120 (M–217), May 25, 1983 & JP–A–58 038323 (Toyo Kogyo KK), Mar. 5, 1983.
Patent Abstracts Of Japan, vol. 006, No. 220 (M–169), Nov. 5, 1982 & JP–A057 124030 (Honda Giken Kogyo KK), Aug. 2, 1982.

Primary Examiner—Raymond A. Nelli
Attorney, Agent, or Firm—Kenyon & Kenyon

[57] ABSTRACT

A combustion chamber of an engine comprising a pair of exhaust valves arranged on one side of an inner wall of a cylinder head. A pair of intake valves are arranged on the other side of the inner wall of the cylinder head. Inflow suppressing walls for suppressing the inflow of the intake air from the openings of the intake valves are formed along the peripheral portions of the intake valves positioned opposite to the exhaust valves and positioned between the intake valves. The parts of the inner wall of the cylinder head around the peripheral portions of the intake valves positioned opposite to the exhaust valves and positioned opposite to the other intake valves are expanded outward from the cylinder bore.

5 Claims, 5 Drawing Sheets

COMBUSTION CHAMBER OF INTERNAL COMBUSTION ENGINE

BACKGROUND OF THE INVENTION

1. Field of the Invention

The present invention relates to a combustion chamber of an internal combustion engine.

2. Description of the Related Art

Known in the art is an internal combustion engine wherein a pair of exhaust valves are arranged on one side of an inner wall of a cylinder head, three intake valves are arranged on the other side of the inner wall of the cylinder head, and the air-fuel mixture is made to flow to the combustion chamber from only the valve openings of the intake valves formed on the exhaust valve side by covering the valve openings of the intake valves formed on the opposite side from the exhaust valves by masking walls to thereby cause the generation of a swirl flow about a horizontal axis, that is, a tumble flow, inside the combustion chamber (see Japanese Unexamined Patent Publication (Kokai) No. 4-159419).

If a tumble flow is made to be generated in the combustion chamber as in the above-mentioned internal combustion engine, the combustion rate is made faster and thus good combustion can be obtained. However, in this internal combustion engine, since the valve openings of the intake valves are covered by the masking walls over a wide range, there is a problem in that the filling efficiency is lowered at the time of a high load operation of the engine and thus a high engine output cannot be obtained. Namely, the most important thing when causing the generation of such a tumble flow is how to cause the generation of a strong tumble flow while preventing the reduction of the filling efficiency.

The first method which is thought of as a method of improving the filling efficiency in such an internal combustion engine is to enlarge the valve diameter of the intake valves so as to enlarge the opening part of the intake valves not covered by the masking walls. However, there is a limit to the enlargement of the valve diameter of the intake valves—the filling efficiency cannot be sufficiently enhanced just by enlarging the valve diameter of the intake valves. However, the inventors engaged in experiments and studies and as a result discovered that the strength of the tumble flow was governed by the tumble flow generated at a center portion of the combustion chamber and accordingly if a masking wall is formed focused to cause generation of a tumble flow at the center portion of the combustion chamber, a sufficiently strong tumble flow could be generated.

When this fact is known, it becomes sufficient to consider only causing generation of a tumble flow at the center portion of the combustion chamber, so it becomes possible to reduce the dimensions of the masking walls in comparison with the case of causing generation of a tumble flow in the entire combustion chamber and thus it becomes possible to improve the filling efficiency. In this case, the smaller the dimensions of the masking walls are made, the more improved the filling efficiency becomes, so the focus becomes at which position the masking walls should be formed for generating the strongest tumble flow even by masking walls with the smallest dimensions.

On the other hand, even if the dimensions of the masking walls can be made smaller in this way, in so far as the masking walls is provided, the filling efficiency is lowered by only the amount of coverage by the masking walls. Accordingly, even if the dimensions of the masking walls can be made smaller in this way, consideration must be given to further improvement of the filling efficiency.

SUMMARY OF THE INVENTION

The present invention was made based on such a viewpoint. Accordingly, the object of the present invention is to provide an internal combustion engine in which a sufficiently high filling efficiency and a sufficiently strong tumble flow can be simultaneously secured.

According to the present invention, there is provided a combustion chamber of an internal combustion engine comprising a pair of exhaust valves arranged on one side of an inner wall of a cylinder head; a pair of intake valves arranged on the other side of the inner wall of the cylinder head; and inflow suppressing walls arranged to face portions of valve openings of the corresponding intake valves for suppressing inflow of air from those portions of the valve openings, the inflow suppressing walls extending along peripheral portions of valve heads of the intake valves, which peripheral portions are positioned between the intake valves at a position opposite to the exhaust valves, the inner wall of the cylinder head having expanded portions each being expanded outwardly from a cylinder bore, each expanded portion being positioned around a peripheral portion of the valve head of the corresponding intake valve at a position opposite from the exhaust valve and opposite to the other intake valve.

BRIEF DESCRIPTION OF THE DRAWINGS

The present invention may be more fully understood from the description of preferred embodiments of the invention set forth below, together with the accompanying drawings, wherein.

DESCRIPTION OF THE PREFERRED EMBODIMENTS

Figure 1:
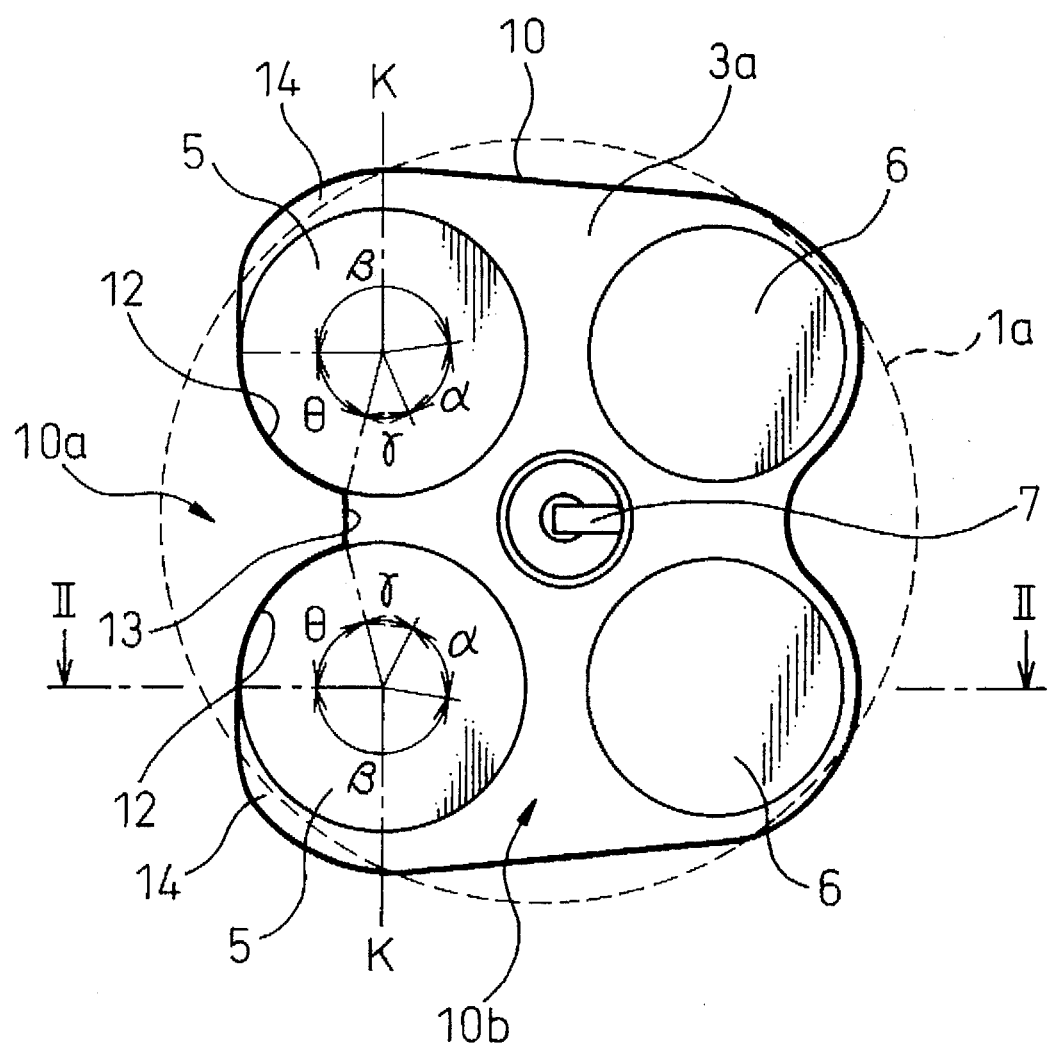
FIG. 1 is a bottom view of a cylinder head.
Figure 2:
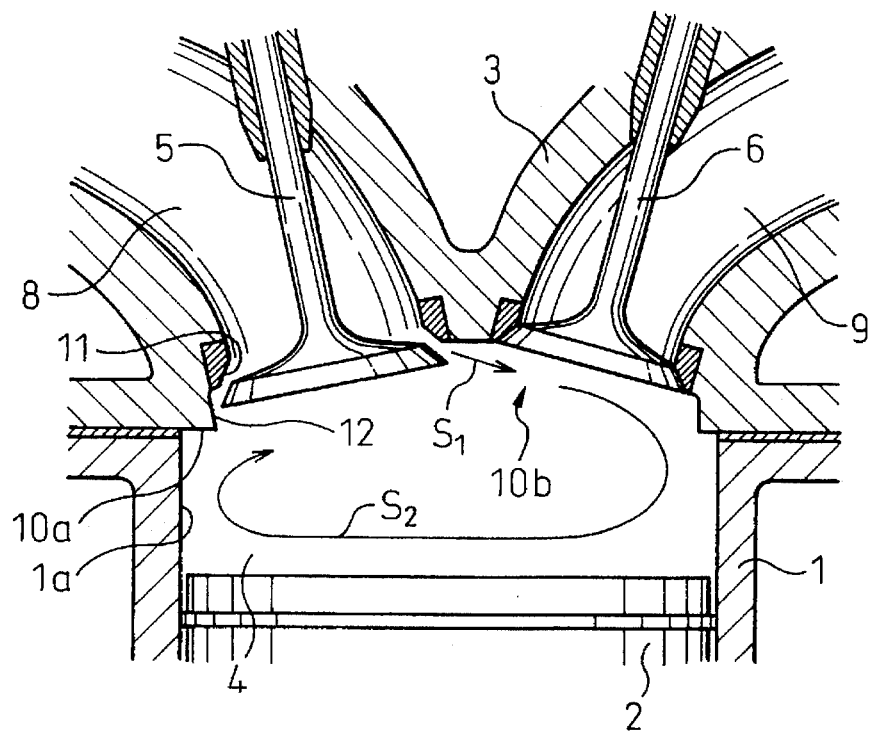
FIG. 2 is a side cross-sectional view of an internal combustion engine seen along a line II—II of FIG. 1.

Referring to FIG. 1 and FIG. 2, 1 denotes a cylinder block; 2, a piston reciprocally moving inside the cylinder block 1; 3, a cylinder head; 4, a combustion chamber; 5, a pair of intake valves arranged on one side of an inner wall 3a of the cylinder head 3; 6, a pair of exhaust valves arranged on the other side of the inner wall 3a of the cylinder head; 7, a spark plug arranged at the center portion of the inner wall 3a of the cylinder head; 8, an intake port; and 9, an exhaust port; respectively. Note that, in FIG. 1, the broken line indicates the position of the cylinder bore 1a. Also, in FIG. 1, the solid line 10 indicates the boundary between a flat lowermost end surface 10a of the cylinder head 3 and a concave portion 10b formed on this flat lowermost end surface 10a. Also, the intake valve 5, exhaust valve 6, and the spark plug 7 are arranged on the inner wall surface 3a of the cylinder head inside this concave portion 10b.

As shown in FIG. 2, an inflow suppressing wall 12, which is arranged to face to an opening formed between the peripheral portion of the intake valve 5 and a valve seat 11 and suppresses the inflow of intake air containing sucked air or fuel from an opening, that is, the air-fuel mixture, is formed on the inner wall 3a of the cylinder head. This inflow suppressing wall 12 extends along the peripheral portion of an intake valve 5 positioned opposite to the exhaust valve 6 and positioned between the intake valves 5 as shown in FIG. 1. Namely, in the embodiment shown in FIG. 1, the inflow suppressing walls 12 extend over an angle θ along the peripheral portions of the intake valves 5 from an opposite side to the exhaust valves 6 with respect to a plane K—K including the axes of the two intake valves 5 to the peripheral portions of the intake valves 5 furthest from the plane K—K. In the embodiment shown in FIG. 1, this angle θ is about 75 degrees.

The inflow suppressing walls 12 formed with respect to the intake valves 5 are connected to each other by an end wall 13 between the two intake valves 5. This end wall 13 is positioned opposite to the exhaust valve 6 with respect to the plane K—K. As shown in FIG. 2, the inflow suppressing walls 12 are arranged at a slight distance from the peripheral portions of the intake valves 5, and the inflow suppressing walls 12 exhibit a cylindrical state around the axes of the intake valves 5. Accordingly, in the embodiment shown in FIG. 1 and FIG. 2, irrespective of the lift positions of the intake valves 5, the distance between the peripheral portions of the intake valves 5 and the inflow suppressing walls 12 becomes almost constant.

On the other hand, the parts 14 of the inner wall of the cylinder head around the peripheral portions of the intake valves 5 which are positioned on the opposite side to the exhaust valves 6 and are positioned on the opposite side from the other intake valves 5 are expanded outwardly from the cylinder bore 1a. Namely, in the embodiment shown in FIG. 1 and FIG. 2, the valve seats of the intake valves 5 are made larger to such an extent that the peripheral portions of the intake valves 5 very closely approach the cylindrical surface including the cylinder bore 1a. In the region where the peripheral portions of the intake valves 5 come very close to the cylindrical surface including the cylinder bore, the cylinder head inner wall part 14 is cut and removed outwardly from the cylinder bore 1a.

When an intake valve 5 opens, there is not much of an inflow of the air-fuel mixture from the space between the intake valve 5 and the inflow suppressing wall 12. The greater part of the air-fuel mixture flows into the combustion chamber 4 from the opening part of the intake valve 5 where the inflow suppressing wall 12 is not provided. At this time, the air-fuel mixture flowing from the opening part of the intake valve 5 opposite to the inflow suppressing wall 12 with respect to the plane K—K heads under the exhaust valve 6 as indicated by an arrow $S_1$ in FIG. 2, then the air-fuel mixture changes in direction as indicated by an arrow $S_2$ of FIG. 2 and flows along the top face of the piston 2. Thus, a swirl flow around the horizontal axis, that is, a tumble flow $S_2$, is generated inside the combustion chamber 4.

The air-fuel mixture flowing from the opening part of the intake valve 5 other than the opening part of intake valve 5 opposite to the inflow suppressing wall 12 with respect to the plane K—K almost never contributes to the generation of the tumble flow. Namely, in FIG. 1, the air-fuel mixtures flowing from the opening parts of the intake valves 5 within a range of an angle β flow in opposite directions to each other, and therefore these air-fuel mixtures almost never contribute to the generation of the tumble flow, while the air-fuel mixtures flowing from the opening parts of the intake valves 5 within a range of an angle γ impinge upon each other, and therefore do not contribute to the generation of the tumble flow.

Contrary to this, the air-fuel mixtures flowing from the opening parts of the intake valves 5 within a range of an angle α directly head under the exhaust valves 6 or impinge upon each other and then head under the exhaust valves 6, and therefore the tumble flow $S_2$ is generated by these air-fuel mixtures. The tumble flow $S_2$ generated by these air-fuel mixtures is a tumble flow which is generated at the center portion of the combustion chamber 4. By generating this tumble flow $S_2$ and in addition by designing things so as not to obstruct this tumble flow $S_2$, it becomes possible to form a strong tumble flow $S_2$ inside the combustion chamber 4.

If the inflow suppressing wall 12 is not provided, the air-fuel mixture flowing from the opening part of the intake valve 5 within a range of an angle θ swirls inside the combustion chamber 4 in an inverse direction to that of the tumble flow $S_2$, and thus the tumble flow $S_2$ is weakened. However, as shown in FIG. 1 and FIG. 2, if the inflow suppressing wall 12 is provided, the amount of the air-fuel mixture flowing from the opening part of the intake valve 5 within a range of an angle α is increased, and therefore the tumble flow $S_2$ is encouraged, and in addition the air-fuel mixture weakening this tumble flow $S_2$ is not generated either, and therefore a strong tumble flow $S_2$ will be generated.

On the other hand, the air-fuel mixture flowing from the opening part of the intake valve 5 within a range of the angle β and within a range of an angle γ contributes to improvement of the filling efficiency. Namely, by providing an inner wall part 14 of the cylinder head expanded outwardly from the cylinder bore 1a, the amount of the intake air flowing into the combustion chamber 4 is increased, and thus the filling efficiency can be enhanced. Also, by forming the inflow suppressing wall 12 on an opposite side to the exhaust valve 6 with respect to the plane K—K, the intake air flows also from the opening part of the intake valve 5 within a range of the angle γ and the filling efficiency is enhanced also by this intake air. Thus, it becomes possible to generate a strong tumble flow $S_2$ inside the combustion chamber 4 while securing a high filling efficiency.

Figure 3:
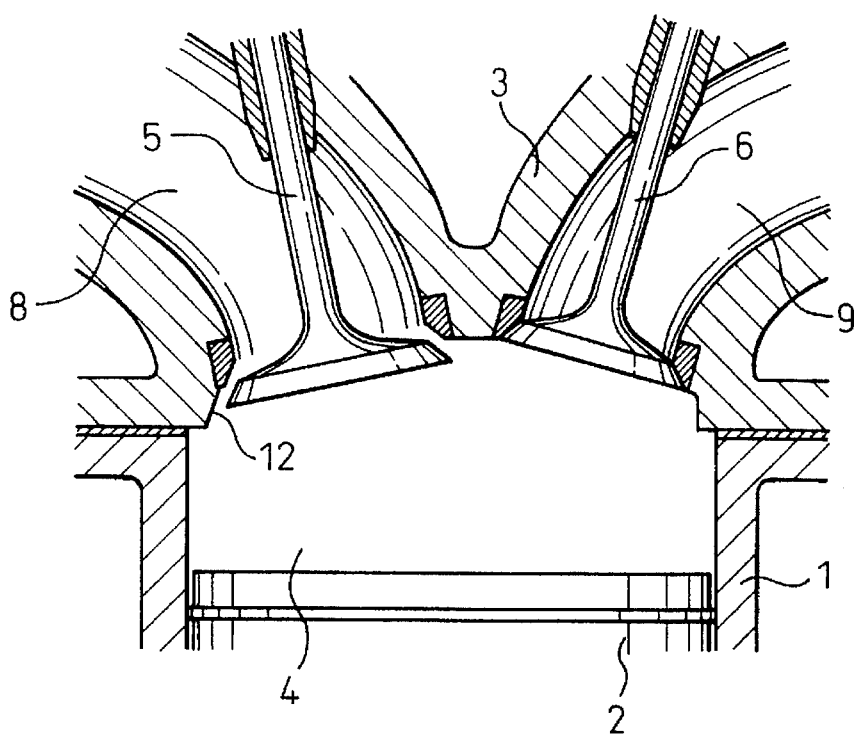
FIG. 3 is a side cross-sectional view of the internal combustion engine showing another embodiment.

FIG. 3 shows another embodiment. When the amount of lift of the intake valve 5 is small, unless the inflow of the air-fuel mixture is suppressed by the inflow suppressing wall 12, a large amount of the air-fuel mixture flows from the opening part of the intake valve 5 within a range of the angle θ. However, when the amount of lift of the intake valve 5 becomes large and the flow rate of the air-fuel mixture flowing in the intake port 8 becomes fast, at the outlet portion of the intake port 8, the air-fuel mixture flow peels off from the bottom wall of the intake port 8, and the air-fuel mixture flow heads toward the exhaust valve 6 side. Accordingly, even if the inflow suppressing wall 12 is not provided, the amount of the air-fuel mixture flowing from the opening part of the intake valve 5 within a range of the angle α becomes considerably larger than the amount of air-fuel mixture flowing from the opening part of the intake valve 5 within a range of the angle θ. Accordingly, when the amount of lift of the intake valve 5 becomes large, it is not necessary to suppress the inflow of so much an amount of air-fuel mixture by the inflow suppressing wall 12, and when the inflow of the air-fuel mixture is not suppressed, the filling efficiency is improved.

Figure 4:
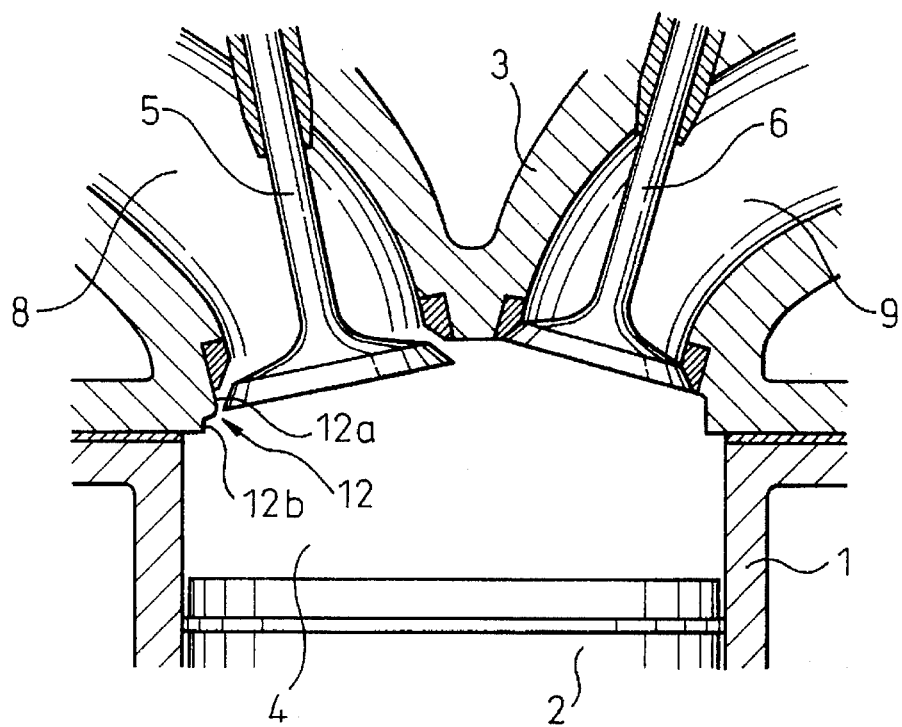
FIG. 4 is a side cross-sectional view of the internal combustion engine showing still another embodiment.

Therefore, in the embodiment shown in FIG. 3, the inflow suppressing wall 12 is made a conical surface expanded downward, whereby the distance between the peripheral portion of the intake valve 5 and the inflow suppressing wall 12 is increased as the amount of lift of the intake valve 5 becomes larger. Also, in the embodiment shown in FIG. 4, the inflow suppressing wall 12 is made a two-step cylindrical surface, where the inflow suppressing wall 12$b$ of the lower step is arranged farther away from the peripheral portion of the intake valve 5 in comparison with the inflow suppressing wall 12$a$ of the upper step.

Figure 5:
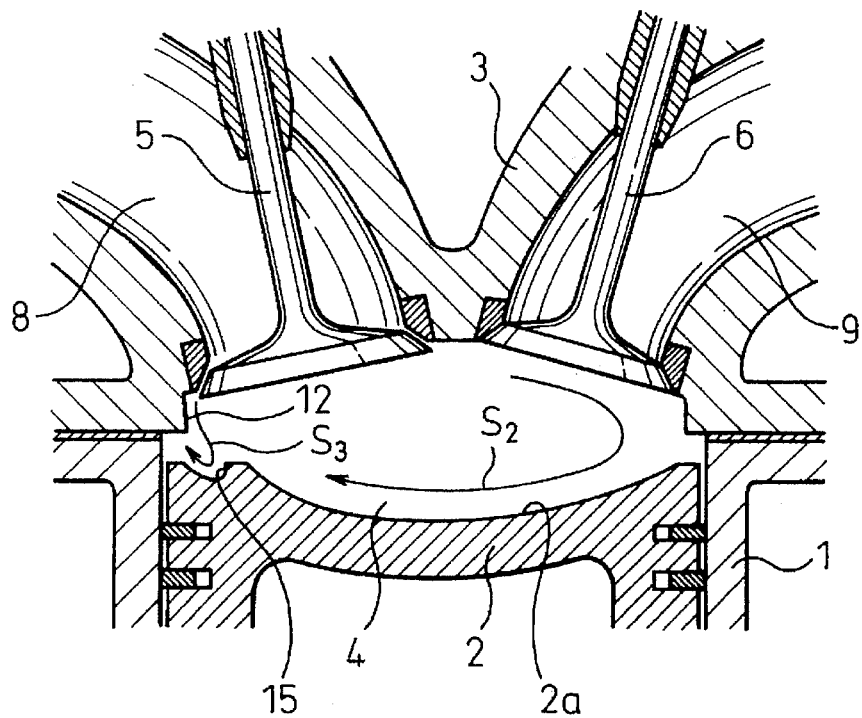
FIG. 5 is a side cross-sectional view of the internal combustion engine showing a still further embodiment.
Figure 6:
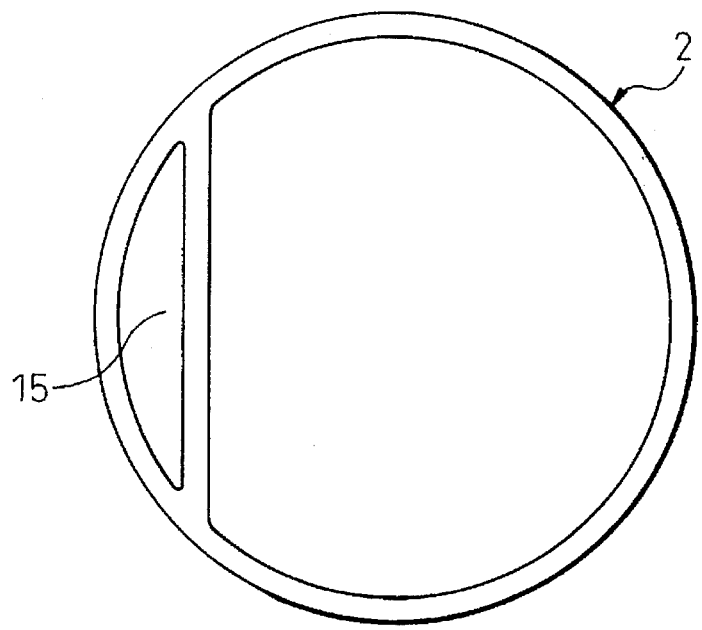
FIG. 6 is a plan view of a piston of FIG. 5.

FIG. 5 and FIG. 6 show another embodiment. In this embodiment, to improve the filling efficiency, in comparison with the embodiment shown in FIG. 1 and FIG. 2, the distance between the inflow suppressing wall 12 and the peripheral portion of the intake valve 5 is made slightly larger. When enlarging the distance between the inflow suppressing wall 12 and the intake valve 5 in this way, as indicated by $S_3$ in FIG. 3, the air-fuel mixture flows from a space between the inflow suppressing wall 12 and the peripheral portion of the intake valve 5, and there is a risk that this air-fuel mixture will just impinge upon the tumble flow $S_2$ and weaken the tumble flow $S_2$.

Therefore, in this embodiment, an air flow biasing wall 15 for biasing the direction of the air-fuel mixture flow $S_3$ to the flow direction of the tumble flow $S_2$ is formed on the top face of the piston 2 beneath of the intake valve 5. In this embodiment, the air flow biasing wall 15 extends straight beneath of the two intake valves 5. In this way, in this embodiment, by biasing the direction of the air-fuel mixture flow $S_3$ by the air flow biasing wall 15, a strong tumble flow $S_2$ is obtained while enhancing the filling efficiency. Further, in this embodiment, the top face 2$a$ of the piston 2 is formed to be a concave shape, whereby the tumble flow $S_2$ smoothly swirls.

Figure 7:
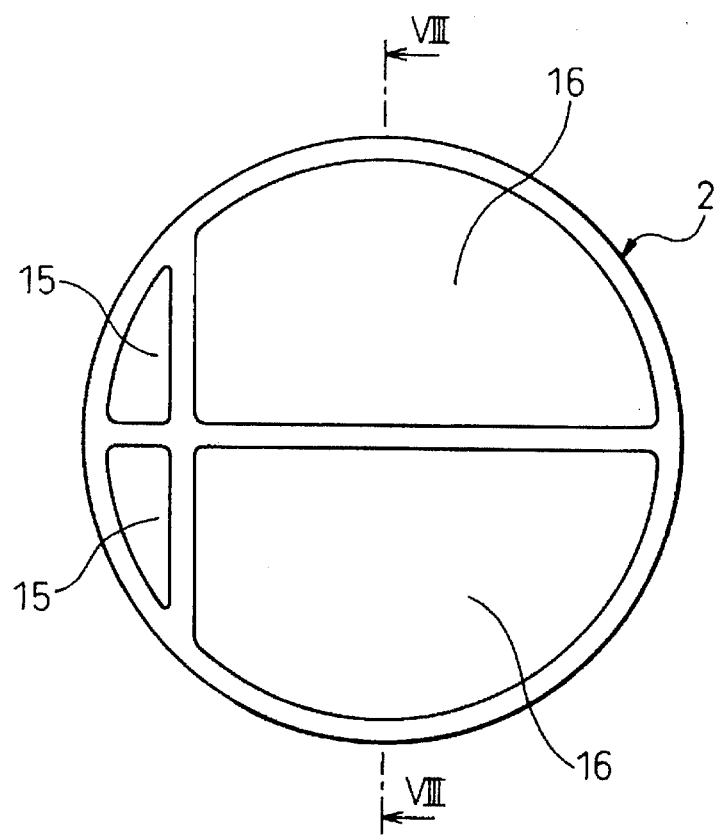
FIG. 7 is a plan view of the piston showing a modification of FIG. 5 and FIG. 6.
Figure 8:
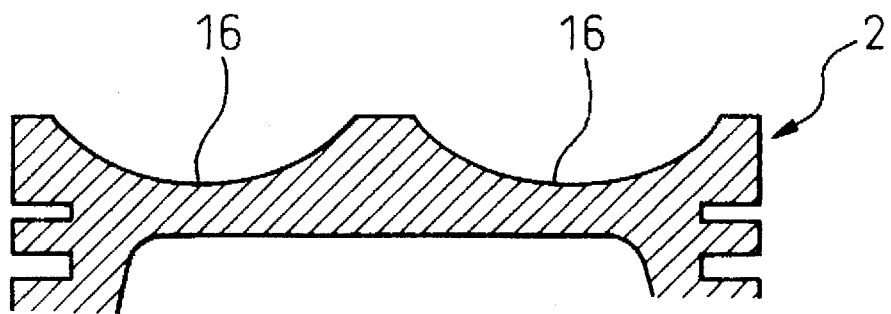
FIG. 8 is a cross-sectional view seen along a line VIII—VIII of FIG. 7.

FIG. 7 and FIG. 8 show a modification of FIG. 5 and FIG. 6. In this embodiment, for guiding the tumble flow formed by the air-fuel mixtures flowing from the intake valves 5, a pair of concave portions 16 are provided on the top face of the piston 2, and air flow biasing walls 15 are formed with respect to the intake valves 5.

According to the present invention, a strong tumble flow can be generated while securing a high filling efficiency.

While the invention has been described by reference to specific embodiments chosen for purposes of illustration, it should be apparent that numerous modifications could be made thereto by those skilled in the art without departing from the basic concept and scope of the invention.

I claim:

1. An combustion chamber of an internal combustion engine comprising:

a pair of exhaust valves arranged on one side of an inner wall of a cylinder head;

a pair of intake valves arranged on the other side of the inner wall of the cylinder head; and inflow suppressing walls arranged to face portions of valve openings of the corresponding intake valves for suppressing inflow of air from said portions of the valve openings, said inflow suppressing walls extending along peripheral portions of valve heads of said intake valves, which peripheral portions are positioned between the intake valves at a position opposite to the exhaust valves, the inner wall of the cylinder head having expanded portions each being expanded outwardly from a cylinder bore, each expanded portion being positioned around a peripheral portion of the valve head of the corresponding intake valve at a position opposite to the exhaust valves and opposite to other intake valve.

2. A combustion chamber of an internal combustion engine as set forth in claim 1, wherein said inflow suppressing walls extend along the peripheral portions of the intake valves from an opposite side to the exhaust valves, with respect to a plane including the axes of the two intake valves, to the peripheral portions of the intake valves furthest from said plane.

3. A combustion chamber of an internal combustion engine as set forth in claim 1, wherein the distance between the peripheral portions of the intake valves and the inflow suppressing walls is constant irrespective of the lift positions of the intake valves.

4. A combustion chamber of an internal combustion engine as set forth in claim 1, wherein the distance between the peripheral portions of the intake valves and the inflow suppressing walls is increased along with an increase of the amount of lift of the intake valves.

5. A combustion chamber of an internal combustion engine as set forth in claim 1, wherein an air flow biasing wall for biasing the direction of flow of the intake air passing through a space between a peripheral portion of an intake valve and an inflow suppressing wall and going toward the top face of the piston to a direction away from the exhaust valve is formed on the top face of the piston.

* * * * *

UNITED STATES PATENT AND TRADEMARK OFFICE
CERTIFICATE OF CORRECTION

PATENT NO. : 5,649,513
DATED : July 22, 1997
INVENTOR(S) : Mutsumi KANDA

It is certified that error appears in the above-indentified patent and that said Letters Patent is hereby corrected as shown below:

```
Column 1, line 67, change "is" to --are--.

Column 5, line 2, change "much" to --great--.

Column 5, line 32, delete "of".

Column 5, line 34, delete "of".

Column 6, line 5, change "An combustion" to --A
combustion--.

Column 6, line 25, before "other" insert --the--.
```

Signed and Sealed this

Fourteenth Day of April, 1998

*Attest:*

BRUCE LEHMAN

*Attesting Officer*   *Commissioner of Patents and Trademarks*